US011292058B2

(12) United States Patent
Lakshman et al.

(10) Patent No.: US 11,292,058 B2
(45) Date of Patent: Apr. 5, 2022

(54) APPARATUS AND METHODS FOR OPTIMIZATION OF POWDER REMOVAL FEATURES IN ADDITIVELY MANUFACTURED COMPONENTS

(71) Applicant: DIVERGENT TECHNOLOGIES, INC., Los Angeles, CA (US)

(72) Inventors: Narender Shankar Lakshman, Torrance, CA (US); Thomas Samuel Bowden, Jr., Los Angeles, CA (US); John Russell Bucknell, El Segundo, CA (US); Ross Harrison Byers, Manhattan Beach, CA (US); Broc William TenHouten, Rancho Palos Verdes, CA (US); Antonio Bernerd Martinez, El Segundo, CA (US); Muhammad Faizan Zafar, Long Beach, CA (US); Richard Winston Hoyle, Clarkston, MI (US); Chukwubuikem Marcel Okoli, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 877 days.

(21) Appl. No.: 15/702,543

(22) Filed: Sep. 12, 2017

(65) Prior Publication Data
US 2019/0076925 A1    Mar. 14, 2019

(51) Int. Cl.
*B33Y 50/00* (2015.01)
*B22F 10/20* (2021.01)
(Continued)

(52) U.S. Cl.
CPC .............. *B22F 10/20* (2021.01); *B22F 3/24* (2013.01); *B23K 26/142* (2015.10);
(Continued)

(58) Field of Classification Search
None
See application file for complete search history.

(56) References Cited

U.S. PATENT DOCUMENTS

| 5,203,226 A | 4/1993 | Hongou et al. |
| 5,742,385 A | 4/1998 | Champa |
(Continued)

FOREIGN PATENT DOCUMENTS

| CN | 102699332 A1 | 10/2012 |
| KR | 101655024 B1 | 9/2016 |
(Continued)

OTHER PUBLICATIONS

US 9,202,136 B2, 12/2015, Schmidt et al. (withdrawn)
(Continued)

*Primary Examiner* — Paul B Yanchus, III
(74) *Attorney, Agent, or Firm* — Arent Fox LLP

(57) ABSTRACT

Techniques for optimizing powder hole removal are disclosed. In one aspect, an apparatus for inserting powder removal features may identify what powder removal features are optimal for a given AM component, as well as the optimal location and physical characteristics of these features. The features are automatedly added to the component, and an FEA test is run. In the event of failure, the offending feature is removed and the process is repeated. If successful then the loose powder may be removed in a post-processing step following AM.

12 Claims, 9 Drawing Sheets

(51) Int. Cl.
*B33Y 10/00* (2015.01)
*B33Y 30/00* (2015.01)
*B33Y 50/02* (2015.01)
*B23K 26/342* (2014.01)
*B23K 26/142* (2014.01)
*B23K 26/14* (2014.01)
*B22F 3/24* (2006.01)
*B33Y 40/00* (2020.01)
*G06F 30/00* (2020.01)
*B22F 10/30* (2021.01)

(52) U.S. Cl.
CPC ........ *B23K 26/1435* (2013.01); *B23K 26/342* (2015.10); *B33Y 10/00* (2014.12); *B33Y 30/00* (2014.12); *B33Y 40/00* (2014.12); *B33Y 50/00* (2014.12); *B33Y 50/02* (2014.12); *G06F 30/00* (2020.01); *B22F 10/30* (2021.01); *B22F 2003/247* (2013.01)

(56) References Cited

U.S. PATENT DOCUMENTS

| | | | |
|---|---|---|---|
| 5,990,444 | A | 11/1999 | Costin |
| 6,010,155 | A | 1/2000 | Rinehart |
| 6,096,249 | A | 8/2000 | Yamaguchi |
| 6,140,602 | A | 10/2000 | Costin |
| 6,250,533 | B1 | 6/2001 | Otterbein et al. |
| 6,252,196 | B1 | 6/2001 | Costin et al. |
| 6,318,642 | B1 | 11/2001 | Goenka et al. |
| 6,365,057 | B1 | 4/2002 | Whitehurst et al. |
| 6,391,251 | B1 | 5/2002 | Keicher et al. |
| 6,409,930 | B1 | 6/2002 | Whitehurst et al. |
| 6,468,439 | B1 | 10/2002 | Whitehurst et al. |
| 6,554,345 | B2 | 4/2003 | Jonsson |
| 6,585,151 | B1 | 7/2003 | Ghosh |
| 6,644,721 | B1 | 11/2003 | Miskech et al. |
| 6,811,744 | B2 | 11/2004 | Keicher et al. |
| 6,866,497 | B2 | 3/2005 | Saiki |
| 6,919,035 | B1 | 7/2005 | Clough |
| 6,926,970 | B2 | 8/2005 | James et al. |
| 7,152,292 | B2 | 12/2006 | Hohmann et al. |
| 7,344,186 | B1 | 3/2008 | Hausler et al. |
| 7,500,373 | B2 | 3/2009 | Quell |
| 7,586,062 | B2 | 9/2009 | Heberer |
| 7,637,134 | B2 | 12/2009 | Burzlaff et al. |
| 7,710,347 | B2 | 5/2010 | Gentilman et al. |
| 7,716,802 | B2 | 5/2010 | Stern et al. |
| 7,745,293 | B2 | 6/2010 | Yamazaki et al. |
| 7,766,123 | B2 | 8/2010 | Sakurai et al. |
| 7,852,388 | B2 | 12/2010 | Shimizu et al. |
| 7,908,922 | B2 | 3/2011 | Zarabadi et al. |
| 7,951,324 | B2 | 5/2011 | Naruse et al. |
| 8,094,036 | B2 | 1/2012 | Heberer |
| 8,163,077 | B2 | 4/2012 | Eron et al. |
| 8,286,236 | B2 | 10/2012 | Jung et al. |
| 8,289,352 | B2 | 10/2012 | Vartanian et al. |
| 8,297,096 | B2 | 10/2012 | Mizumura et al. |
| 8,354,170 | B1 | 1/2013 | Henry et al. |
| 8,383,028 | B2 | 2/2013 | Lyons |
| 8,408,036 | B2 | 4/2013 | Reith et al. |
| 8,429,754 | B2 | 4/2013 | Jung et al. |
| 8,437,513 | B1 | 5/2013 | Derakhshani et al. |
| 8,444,903 | B2 | 5/2013 | Lyons et al. |
| 8,452,073 | B2 | 5/2013 | Taminger et al. |
| 8,599,301 | B2 | 12/2013 | Dowski, Jr. et al. |
| 8,606,540 | B2 | 12/2013 | Haisty et al. |
| 8,610,761 | B2 | 12/2013 | Haisty et al. |
| 8,631,996 | B2 | 1/2014 | Quell et al. |
| 8,675,925 | B2 | 3/2014 | Derakhshani et al. |
| 8,678,060 | B2 | 3/2014 | Dietz et al. |
| 8,686,314 | B2 | 4/2014 | Schneegans et al. |
| 8,686,997 | B2 | 4/2014 | Radet et al. |
| 8,694,284 | B2 | 4/2014 | Berard |
| 8,720,876 | B2 | 5/2014 | Reith et al. |
| 8,752,166 | B2 | 6/2014 | Jung et al. |
| 8,755,923 | B2 | 6/2014 | Farahani et al. |
| 8,787,628 | B1 | 7/2014 | Derakhshani et al. |
| 8,818,771 | B2 | 8/2014 | Gielis et al. |
| 8,873,238 | B2 | 10/2014 | Wilkins |
| 8,978,535 | B2 | 3/2015 | Ortiz et al. |
| 9,006,605 | B2 | 4/2015 | Schneegans et al. |
| 9,071,436 | B2 | 6/2015 | Jung et al. |
| 9,101,979 | B2 | 8/2015 | Hofmann et al. |
| 9,104,921 | B2 | 8/2015 | Derakhshani et al. |
| 9,126,365 | B1 | 9/2015 | Mark et al. |
| 9,128,476 | B2 | 9/2015 | Jung et al. |
| 9,138,924 | B2 | 9/2015 | Yen |
| 9,149,988 | B2 | 10/2015 | Mark et al. |
| 9,156,205 | B2 | 10/2015 | Mark et al. |
| 9,186,848 | B2 | 11/2015 | Mark et al. |
| 9,244,986 | B2 | 1/2016 | Karmarkar |
| 9,248,611 | B2 | 2/2016 | Divine et al. |
| 9,254,535 | B2 | 2/2016 | Buller et al. |
| 9,266,566 | B2 | 2/2016 | Kim |
| 9,269,022 | B2 | 2/2016 | Rhoads et al. |
| 9,327,452 | B2 | 5/2016 | Mark et al. |
| 9,329,020 | B1 | 5/2016 | Napoletano |
| 9,332,251 | B2 | 5/2016 | Haisty et al. |
| 9,346,127 | B2 | 5/2016 | Buller et al. |
| 9,389,315 | B2 | 7/2016 | Bruder et al. |
| 9,399,256 | B2 | 7/2016 | Buller et al. |
| 9,403,235 | B2 | 8/2016 | Buller et al. |
| 9,418,193 | B2 | 8/2016 | Dowski, Jr. et al. |
| 9,457,514 | B2 | 10/2016 | Schwärzler |
| 9,469,057 | B2 | 10/2016 | Johnson et al. |
| 9,478,063 | B2 | 10/2016 | Rhoads et al. |
| 9,481,402 | B1 | 11/2016 | Muto et al. |
| 9,486,878 | B2 | 11/2016 | Buller et al. |
| 9,486,960 | B2 | 11/2016 | Paschkewitz et al. |
| 9,502,993 | B2 | 11/2016 | Deng |
| 9,525,262 | B2 | 12/2016 | Stuart et al. |
| 9,533,526 | B1 | 1/2017 | Nevins |
| 9,555,315 | B2 | 1/2017 | Aders |
| 9,555,580 | B1 | 1/2017 | Dykstra et al. |
| 9,557,856 | B2 | 1/2017 | Send et al. |
| 9,566,742 | B2 | 2/2017 | Keating et al. |
| 9,566,758 | B2 | 2/2017 | Cheung et al. |
| 9,573,193 | B2 | 2/2017 | Buller et al. |
| 9,573,225 | B2 | 2/2017 | Buller et al. |
| 9,586,290 | B2 | 3/2017 | Buller et al. |
| 9,595,795 | B2 | 3/2017 | Lane et al. |
| 9,597,843 | B2 | 3/2017 | Stauffer et al. |
| 9,600,929 | B1 | 3/2017 | Young et al. |
| 9,609,755 | B2 | 3/2017 | Coull et al. |
| 9,610,737 | B2 | 4/2017 | Johnson et al. |
| 9,611,667 | B2 | 4/2017 | GangaRao et al. |
| 9,616,623 | B2 | 4/2017 | Johnson et al. |
| 9,626,487 | B2 | 4/2017 | Jung et al. |
| 9,626,489 | B2 | 4/2017 | Nilsson |
| 9,643,361 | B2 | 5/2017 | Liu |
| 9,662,840 | B1 | 5/2017 | Buller et al. |
| 9,665,182 | B2 | 5/2017 | Send et al. |
| 9,672,389 | B1 | 6/2017 | Mosterman et al. |
| 9,672,550 | B2 | 6/2017 | Apsley et al. |
| 9,676,145 | B2 | 6/2017 | Buller et al. |
| 9,684,919 | B2 | 6/2017 | Apsley et al. |
| 9,688,032 | B2 | 6/2017 | Kia et al. |
| 9,690,286 | B2 | 6/2017 | Hovsepian et al. |
| 9,700,966 | B2 | 7/2017 | Kraft et al. |
| 9,703,896 | B2 | 7/2017 | Zhang et al. |
| 9,713,903 | B2 | 7/2017 | Paschkewitz et al. |
| 9,718,302 | B2 | 8/2017 | Young et al. |
| 9,718,434 | B2 | 8/2017 | Hector, Jr. et al. |
| 9,724,877 | B2 | 8/2017 | Flitsch et al. |
| 9,724,881 | B2 | 8/2017 | Johnson et al. |
| 9,725,178 | B2 | 8/2017 | Wang |
| 9,731,730 | B2 | 8/2017 | Stiles |
| 9,731,773 | B2 | 8/2017 | Gami et al. |
| 9,741,954 | B2 | 8/2017 | Bruder et al. |
| 9,747,352 | B2 | 8/2017 | Karmarkar |
| 9,764,415 | B2 | 9/2017 | Seufzer et al. |
| 9,764,520 | B2 | 9/2017 | Johnson et al. |
| 9,765,226 | B2 | 9/2017 | Dain |

(56) References Cited

U.S. PATENT DOCUMENTS

| | | | |
|---|---|---|---|
| 9,770,760 | B2 | 9/2017 | Liu |
| 9,773,393 | B2 | 9/2017 | Velez |
| 9,776,234 | B2 | 10/2017 | Schaafhausen et al. |
| 9,782,936 | B2 | 10/2017 | Glunz et al. |
| 9,783,324 | B2 | 10/2017 | Embler et al. |
| 9,783,977 | B2 | 10/2017 | Alqasimi et al. |
| 9,789,548 | B2 | 10/2017 | Golshany et al. |
| 9,789,922 | B2 | 10/2017 | Dosenbach et al. |
| 9,796,137 | B2 | 10/2017 | Zhang et al. |
| 9,802,108 | B2 | 10/2017 | Aders |
| 9,809,977 | B2 | 11/2017 | Carney et al. |
| 9,817,922 | B2 | 11/2017 | Glunz et al. |
| 9,818,071 | B2 | 11/2017 | Jung et al. |
| 9,821,339 | B2 | 11/2017 | Paschkewitz et al. |
| 9,821,411 | B2 | 11/2017 | Buller et al. |
| 9,823,143 | B2 | 11/2017 | Twelves, Jr. et al. |
| 9,829,564 | B2 | 11/2017 | Bruder et al. |
| 9,846,933 | B2 | 12/2017 | Yuksel |
| 9,854,828 | B2 | 1/2018 | Langeland |
| 9,858,604 | B2 | 1/2018 | Apsley et al. |
| 9,862,833 | B2 | 1/2018 | Hasegawa et al. |
| 9,862,834 | B2 | 1/2018 | Hasegawa et al. |
| 9,863,885 | B2 | 1/2018 | Zaretski et al. |
| 9,870,629 | B2 | 1/2018 | Cardno et al. |
| 9,879,981 | B1 | 1/2018 | Dehghan Niri et al. |
| 9,884,663 | B2 | 2/2018 | Czinger et al. |
| 9,898,776 | B2 | 2/2018 | Apsley et al. |
| 9,914,150 | B2 | 3/2018 | Pettersson et al. |
| 9,919,360 | B2 | 3/2018 | Buller et al. |
| 9,931,697 | B2 | 4/2018 | Levin et al. |
| 9,933,031 | B2 | 4/2018 | Bracamonte et al. |
| 9,933,092 | B2 | 4/2018 | Sindelar |
| 9,957,031 | B2 | 5/2018 | Golshany et al. |
| 9,958,535 | B2 | 5/2018 | Send et al. |
| 9,962,767 | B2 | 5/2018 | Buller et al. |
| 9,963,978 | B2 | 5/2018 | Johnson et al. |
| 9,971,920 | B2 | 5/2018 | Derakhshani et al. |
| 9,976,063 | B2 | 5/2018 | Childers et al. |
| 9,987,792 | B2 | 6/2018 | Flitsch et al. |
| 9,988,136 | B2 | 6/2018 | Tiryaki et al. |
| 9,989,623 | B2 | 6/2018 | Send et al. |
| 9,990,565 | B2 | 6/2018 | Rhoads et al. |
| 9,994,339 | B2 | 6/2018 | Colson et al. |
| 9,996,890 | B1 | 6/2018 | Cinnamon et al. |
| 9,996,945 | B1 | 6/2018 | Holzer et al. |
| 10,002,215 | B2 | 6/2018 | Dowski et al. |
| 10,006,156 | B2 | 6/2018 | Kirkpatrick |
| 10,011,089 | B2 | 7/2018 | Lyons et al. |
| 10,011,685 | B2 | 7/2018 | Childers et al. |
| 10,012,532 | B2 | 7/2018 | Send et al. |
| 10,013,777 | B2 | 7/2018 | Mariampillai et al. |
| 10,015,908 | B2 | 7/2018 | Williams et al. |
| 10,016,852 | B2 | 7/2018 | Broda |
| 10,016,942 | B2 | 7/2018 | Mark et al. |
| 10,017,384 | B1 | 7/2018 | Greer et al. |
| 10,018,576 | B2 | 7/2018 | Herbsommer et al. |
| 10,022,792 | B2 | 7/2018 | Srivas et al. |
| 10,022,912 | B2 | 7/2018 | Kia et al. |
| 10,027,376 | B2 | 7/2018 | Sankaran et al. |
| 10,029,415 | B2 | 7/2018 | Swanson et al. |
| 10,040,239 | B2 | 8/2018 | Brown, Jr. |
| 10,046,412 | B2 | 8/2018 | Blackmore |
| 10,048,769 | B2 | 8/2018 | Selker et al. |
| 10,052,712 | B2 | 8/2018 | Blackmore |
| 10,052,820 | B2 | 8/2018 | Kemmer et al. |
| 10,055,536 | B2 | 8/2018 | Maes et al. |
| 10,058,764 | B2 | 8/2018 | Aders |
| 10,058,920 | B2 | 8/2018 | Buller et al. |
| 10,061,906 | B2 | 8/2018 | Nilsson |
| 10,065,270 | B2 | 9/2018 | Buller et al. |
| 10,065,361 | B2 | 9/2018 | Susnjara et al. |
| 10,065,367 | B2 | 9/2018 | Brown, Jr. |
| 10,068,316 | B1 | 9/2018 | Holzer et al. |
| 10,071,422 | B2 | 9/2018 | Buller et al. |
| 10,071,525 | B2 | 9/2018 | Susnjara et al. |
| 10,072,179 | B2 | 9/2018 | Drijfhout |
| 10,074,128 | B2 | 9/2018 | Colson et al. |
| 10,076,875 | B2 | 9/2018 | Mark et al. |
| 10,076,876 | B2 | 9/2018 | Mark et al. |
| 10,081,140 | B2 | 9/2018 | Paesano et al. |
| 10,081,431 | B2 | 9/2018 | Seack et al. |
| 10,086,568 | B2 | 10/2018 | Snyder et al. |
| 10,087,320 | B2 | 10/2018 | Simmons et al. |
| 10,087,556 | B2 | 10/2018 | Gallucci et al. |
| 10,099,427 | B2 | 10/2018 | Mark et al. |
| 10,100,542 | B2 | 10/2018 | GangaRao et al. |
| 10,100,890 | B2 | 10/2018 | Bracamonte et al. |
| 10,107,344 | B2 | 10/2018 | Bracamonte et al. |
| 10,108,766 | B2 | 10/2018 | Druckman et al. |
| 10,113,600 | B2 | 10/2018 | Bracamonte et al. |
| 10,118,347 | B2 | 11/2018 | Stauffer et al. |
| 10,118,579 | B2 | 11/2018 | Lakic |
| 10,120,078 | B2 | 11/2018 | Bruder et al. |
| 10,124,546 | B2 | 11/2018 | Johnson et al. |
| 10,124,570 | B2 | 11/2018 | Evans et al. |
| 10,137,500 | B2 | 11/2018 | Blackmore |
| 10,138,354 | B2 | 11/2018 | Groos et al. |
| 10,144,126 | B2 | 12/2018 | Krohne et al. |
| 10,145,110 | B2 | 12/2018 | Carney et al. |
| 10,151,363 | B2 | 12/2018 | Bracamonte et al. |
| 10,152,661 | B2 | 12/2018 | Kieser |
| 10,160,278 | B2 | 12/2018 | Coombs et al. |
| 10,161,021 | B2 | 12/2018 | Lin et al. |
| 10,166,752 | B2 | 1/2019 | Evans et al. |
| 10,166,753 | B2 | 1/2019 | Evans et al. |
| 10,171,578 | B1 | 1/2019 | Cook et al. |
| 10,173,255 | B2 | 1/2019 | TenHouten et al. |
| 10,173,327 | B2 | 1/2019 | Kraft et al. |
| 10,178,800 | B2 | 1/2019 | Mahalingam et al. |
| 10,179,640 | B2 | 1/2019 | Wilkerson |
| 10,183,330 | B2 | 1/2019 | Buller et al. |
| 10,183,478 | B2 | 1/2019 | Evans et al. |
| 10,189,187 | B2 | 1/2019 | Keating et al. |
| 10,189,240 | B2 | 1/2019 | Evans et al. |
| 10,189,241 | B2 | 1/2019 | Evans et al. |
| 10,189,242 | B2 | 1/2019 | Evans et al. |
| 10,190,424 | B2 | 1/2019 | Johnson et al. |
| 10,195,693 | B2 | 2/2019 | Buller et al. |
| 10,196,539 | B2 | 2/2019 | Boonen et al. |
| 10,197,338 | B2 | 2/2019 | Melsheimer |
| 10,200,677 | B2 | 2/2019 | Trevor et al. |
| 10,201,932 | B2 | 2/2019 | Flitsch et al. |
| 10,201,941 | B2 | 2/2019 | Evans et al. |
| 10,202,673 | B2 | 2/2019 | Lin et al. |
| 10,204,216 | B2 | 2/2019 | Nejati et al. |
| 10,207,454 | B2 | 2/2019 | Buller et al. |
| 10,209,065 | B2 | 2/2019 | Estevo, Jr. et al. |
| 10,210,662 | B2 | 2/2019 | Holzer et al. |
| 10,213,837 | B2 | 2/2019 | Kondoh |
| 10,214,248 | B2 | 2/2019 | Hall et al. |
| 10,214,252 | B2 | 2/2019 | Schellekens et al. |
| 10,214,275 | B2 | 2/2019 | Goehlich |
| 10,220,575 | B2 | 3/2019 | Reznar |
| 10,220,881 | B2 | 3/2019 | Tyan et al. |
| 10,221,530 | B2 | 3/2019 | Driskell et al. |
| 10,226,900 | B1 | 3/2019 | Nevins |
| 10,232,550 | B2 | 3/2019 | Evans et al. |
| 10,234,342 | B2 | 3/2019 | Moorlag et al. |
| 10,237,477 | B2 | 3/2019 | Trevor et al. |
| 10,252,335 | B2 | 4/2019 | Buller et al. |
| 10,252,336 | B2 | 4/2019 | Buller et al. |
| 10,254,499 | B1 | 4/2019 | Cohen et al. |
| 10,257,499 | B2 | 4/2019 | Hintz et al. |
| 10,259,044 | B2 | 4/2019 | Buller et al. |
| 10,268,181 | B1 | 4/2019 | Nevins |
| 10,269,225 | B2 | 4/2019 | Velez |
| 10,272,860 | B2 | 4/2019 | Mohapatra et al. |
| 10,272,862 | B2 | 4/2019 | Whitehead |
| 10,275,564 | B2 | 4/2019 | Ridgeway et al. |
| 10,279,580 | B2 | 5/2019 | Evans et al. |
| 10,285,219 | B2 | 5/2019 | Fetfatsidis et al. |
| 10,286,452 | B2 | 5/2019 | Buller et al. |
| 10,286,603 | B2 | 5/2019 | Buller et al. |
| 10,286,961 | B2 | 5/2019 | Hillebrecht et al. |

(56) References Cited

U.S. PATENT DOCUMENTS

| | | | |
|---|---|---|---|
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2012/0192424 A1* | 8/2012 | Cataldo ............... G04D 3/00 29/896.33 |
| 2014/0277669 A1 | 9/2014 | Nardi et al. |
| 2015/0134095 A1* | 5/2015 | Hemani ............... B29C 64/386 700/98 |
| 2016/0059489 A1 | 3/2016 | Wang et al. |
| 2016/0136883 A1* | 5/2016 | Schmidt ............... B29C 64/386 264/129 |
| 2016/0259866 A1 | 9/2016 | Bigos et al. |
| 2016/0314617 A1 | 10/2016 | Forster et al. |
| 2017/0113344 A1 | 4/2017 | Schönberg |
| 2017/0232670 A1 | 8/2017 | Joerger et al. |
| 2017/0341309 A1 | 11/2017 | Piepenbrock et al. |
| 2018/0142746 A1* | 5/2018 | Hodgkins ............... F16D 55/22 |
| 2019/0333284 A1* | 10/2019 | Abunojaim ........... G06T 19/006 |

FOREIGN PATENT DOCUMENTS

| | | |
|---|---|---|
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion dated Nov. 26, 2018, regarding PCT/US2018/044939.
English Translation of the Notification of the Office Action issued for corresponding application CN 201880073194.4, dated Aug. 26, 2021, 10 pages.
Chinese version of the Notification of the first Office Action issued for corresponding application CN 201880073194.4, dated Aug. 26, 2021.
English language machine translation of foreign reference document CN102699332A.

* cited by examiner

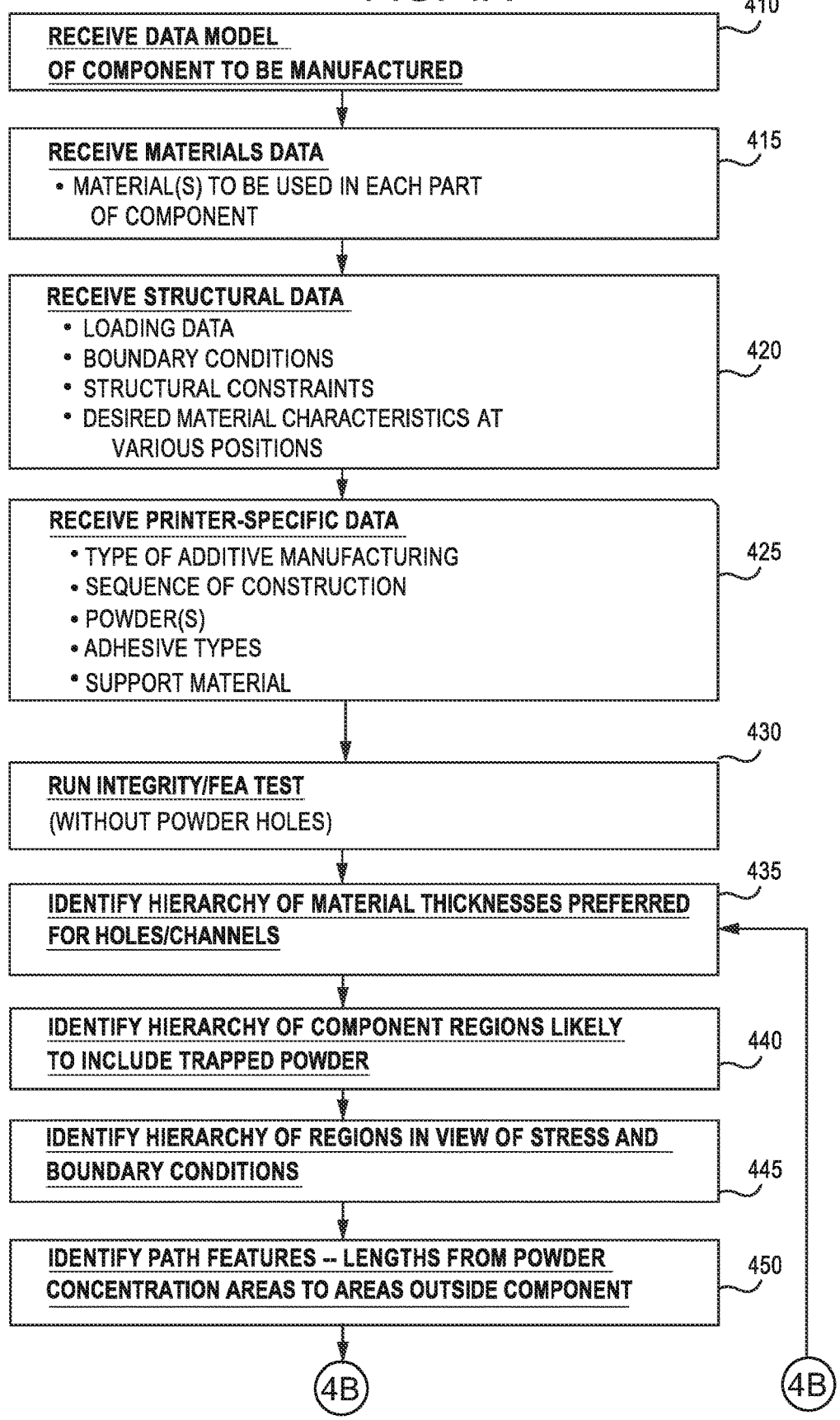

APPARATUS AND METHODS FOR OPTIMIZATION OF POWDER REMOVAL FEATURES IN ADDITIVELY MANUFACTURED COMPONENTS

BACKGROUND

Field

The present disclosure relates generally to techniques for additive manufacturing, and more specifically to powder removal techniques in additively manufactured components.

Background

Additive Manufacturing (AM), commonly known as three-dimensional (3-D) printing, involves the use of a stored geometrical model for accumulating layered materials on a 'build plate' to produce a 3-D object having features defined by the model. AM techniques are capable of printing complex components using a wide variety of materials. A solid 3-D object can be fabricated based on a computer aided design (CAD) model.

AM processes such as powder bed fusion (PBF) use a laser or electron beam to melt and fuse together cross-sections of the layers of powdered material. The melting bonds the powder particles together in targeted areas of each layer to produce a 3-D structure having the desired geometry. Different materials or combinations of material, such as engineering plastics, thermoplastic elastomers, metals, and ceramics may be used in PBF to create the 3-D object.

After a structure is additively manufactured, a significant amount of loose powder can remain scattered and embedded within the structure. To address this problem, designers manually designate holes in CAD modeled structures. The holes placed in the data model are then physically built into the AM structure and used to extract the residual powder from the structure after the AM process. This process, however, is manually intensive and therefore inefficient. Further, the manual hole placement process, which involves at least partial guesswork, may not produce optimal powder removal configurations. For example, such manual placement may lead to inadvertent placement of holes in difficult-to-access or other undesirable portions of the structure. In general, this conventional process may involve an initial modification of the CAD model with manual hole placement. Next, Finite Element Analysis ("FEA") tests for structural integrity may take place on the CAD model, and the initial manual placement of the holes may need to be changed to accommodate identified structural deficiencies. This process may have to be repeated a number of times, and becomes increasingly burdensome as the number of component types to be additively manufactured increases.

SUMMARY

Several aspects of techniques for automated powder removal from AM components will be described more fully hereinafter with reference to three-dimensional printing techniques.

In one aspect, a method for automatedly inserting powder removal features in an additively manufactured component includes receiving a model of a component to be additively manufactured, automatedly determining optimal size and location of one or more apertures in the component for powder removal, and updating the model to include the one or more determined powder removal apertures.

In another aspect, a method for removing powder from an additively manufactured component includes receiving a data model of the component, the component having at least one aperture, additively manufacturing the component based on the data model, removing trapped powder from the additively manufactured component using the at least one aperture, and performing a layup process using at least one material to seal the at least one aperture.

In another aspect, a 3-D printer includes a powder bed for storing powder, a depositor configured to deposit successive layers of the powder, an energy beam, a deflector configured to apply the energy beam to fuse the powder, a build plate configured to support a build piece, and a processing system configured to receive a model of a component to be additively manufactured, determine optimal size and location of one or more apertures in the component for powder removal, update the model to include the one or more determined powder removal apertures, and use the updated model to control the energy beam to 3-D print the build piece.

In still another aspect, an apparatus for automatedly inserting powder removal features in an additively manufactured component is configured to determine optimal size and location of one or more apertures in the component for powder removal, and update the model to include the one or more determined powder removal apertures.

It will be understood that other aspects of additively manufacturing transport structures will become apparent to those skilled in the art from the following detailed description, wherein it is shown and described only several embodiments by way of illustration. As will be realized by those skilled in the art, the techniques for automated powder removal from AM components are capable of other and different embodiments and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of the methods and apparatuses for techniques for automated powder removal from AM components will now be presented in the detailed description by way of example, and not by way of limitation, in the accompanying drawings, wherein:

FIGS. 4A-B are a flow diagram illustrating an exemplary process for automatedly inserting apertures and channels into a data model for removal of powder from an AM structure based on that model.

DETAILED DESCRIPTION

Figure 1:
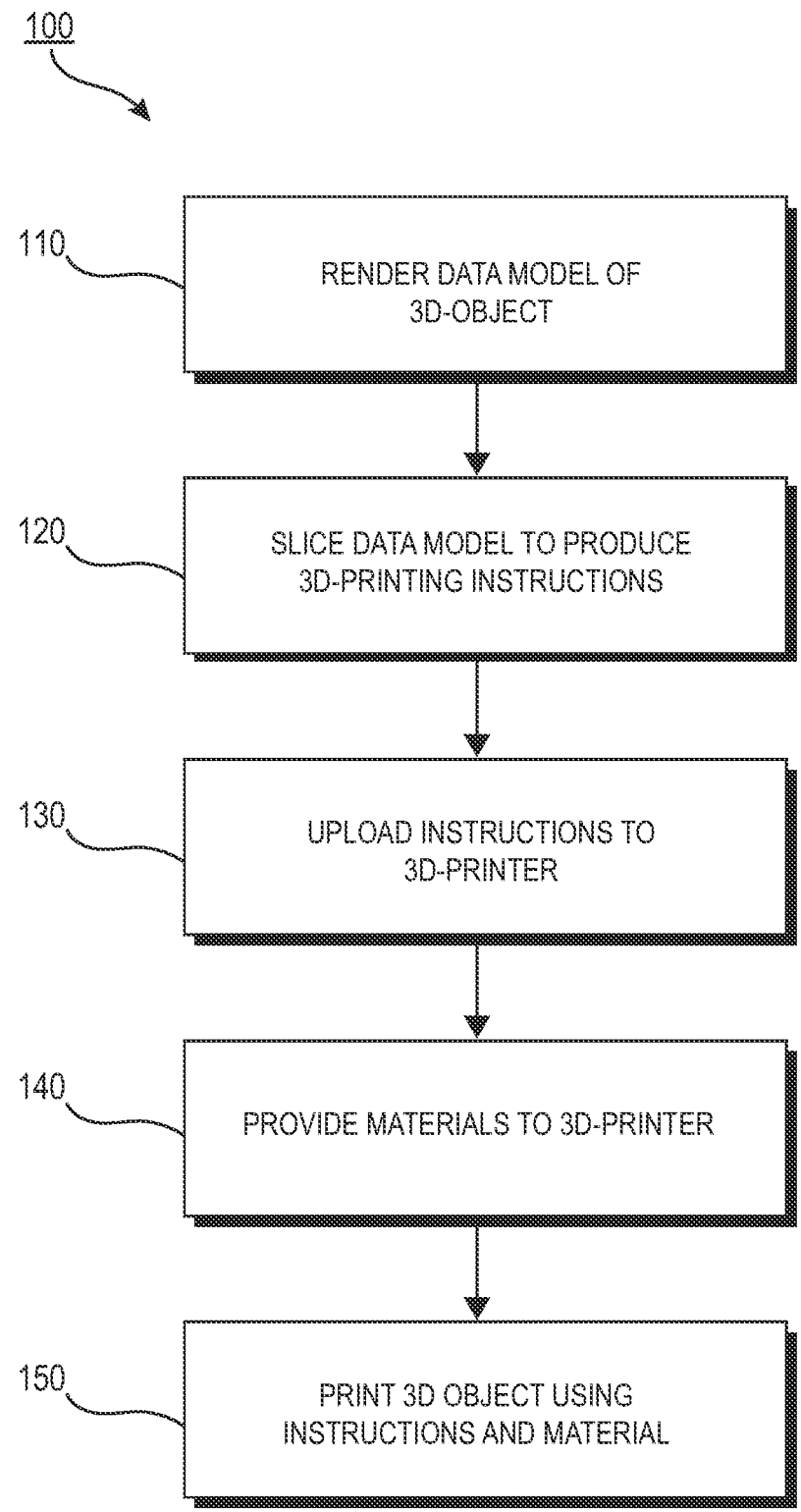
FIG. 1 illustrates a conceptual flow diagram of a process for additively manufacturing an object using a 3-D printer.

The detailed description set forth below in connection with the appended drawings is intended to provide a description of various exemplary embodiments of techniques for automated powder hole insertion and removal techniques for AM technologies and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

This disclosure is generally directed to techniques for automated insertion of channels and apertures into modelled AM structures for use in powder removal from the actual AM structures after the structures are additively manufactured. A variety of different AM techniques have been developed or are being developed. The techniques described in this disclosure have broad applicability to the existing classes of AM technologies as well as AM techniques that are under development or that may be developed in the future. Examples of a certain AM class of technologies known as powder bed fusion are illustrated further below.

FIG. 2 is a flow diagram 100 illustrating an exemplary process of 3-D printing. A data model of the desired 3-D object to be printed is designed in software (step 110). A data model is a virtual design of the 3-D object. Thus, the data model may reflect the geometrical and structural features of the 3-D object, as well as its material composition. The data model may be created using a variety of methods, including CAE-based optimization, 3D modeling, photogrammetry software, and camera imaging. CAE-based optimization may include, for example, cloud-based optimization, fatigue analysis, linear or non-linear finite element analysis (FEA), and durability analysis.

3-D modeling software, in turn, may include one of numerous commercially available 3-D modeling software applications. Data models may be rendered using a suitable computer-aided design (CAD) package, for example in an STL format. STL is one example of a file format associated with commercially available STL-based CAD software. A CAD program may be used to create the data model of the 3-D object as an STL file. Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular AM technology to be utilized (step 120). Numerous slicer programs are commercially available. Generally, the slicer program converts the data model into a series of individual layers representing thin slices (e.g., 100 microns thick) of the object be printed, along with a file containing the printer-specific instructions for 3-D printing these successive individual layers to produce an actual AM representation of the data model.

A common type of file used for this purpose is a G-code file, which is a numerical control programming language that includes instructions for 3-D printing the object. The G-code file, or other file constituting the instructions, is uploaded to the 3-D printer (step 130). Because the file containing these instructions is typically configured to be operable with a specific AM process, it will be appreciated that many formats of the instruction file are possible depending on the AM technology used.

In addition to the printing instructions that dictate what object is to be rendered and how that object is to be rendered, the appropriate physical materials necessary for use by the 3-D printer in rendering the object are loaded into the 3-D printer using any of several conventional and often printer-specific methods (step 140). In selective laser sintering (SLS) printing, selective laser melting (SLM) and other methods, the materials may be loaded as powders into chambers that feed the powder to a build platform. Depending on the 3-D printer, other techniques for loading printing materials may be used.

The respective data slices of the 3-D object are then printed based on the provided instructions using the material(s) (step 150). In fused deposition modelling, as described above, parts are printed by applying successive layers of model and support materials to a substrate. As noted above, any suitable AM technology may be employed for purposes of this disclosure.

One class of AM techniques includes powder-bed fusion ("PBF"). PBF AM techniques include, by way of example, selective laser melting (SLM), selective laser sintering (SLS), direct metal laser sintering (DMLS), electron beam melting (EBM), and selective heat sintering (SHS). Like FDM, PBF creates 'build pieces' layer-by-layer. Each layer or 'slice' is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

In 3-D printers that use SLM, a laser scans a powder bed and melts the powder together where structure is desired, and avoids scanning areas where the sliced data indicates that nothing is to be printed. This process may be repeated thousands of times until the desired structure is formed, after which the printed part is removed from a fabricator.

FIGS. 2A-D illustrate respective side views of an exemplary PBF system 200 during different stages of operation. As noted above, the particular embodiment illustrated in FIGS. 2A-D is one of many suitable examples of a PBF system employing principles of this disclosure. It should also be noted that elements of FIGS. 2A-D and the other figures in this disclosure are not necessarily drawn to scale, but may be drawn larger or smaller for the purpose of better illustration of concepts described herein. PBF system 200 can include a depositor 201 that can deposit each layer of metal powder, an energy beam source 203 that can generate an energy beam, a deflector 205 that can apply the energy beam to fuse the powder, and a build plate 207 that can support one or more build pieces, such as a build piece 209. PBF system 200 can also include a build floor 211 positioned within a powder bed receptacle. The walls of the powder bed receptacle 212 generally define the boundaries of the powder bed receptacle, which is sandwiched between the walls 212 from the side and abuts a portion of the build floor 211 below. Build floor 211 can progressively lower build plate 207 so that depositor 201 can deposit a next layer. The entire mechanism may reside in a chamber 213 that can enclose the other components, thereby protecting the equipment, enabling atmospheric and temperature regulation and mitigating contamination risks. Depositor 201 can include a hopper 215 that contains a powder 217, such as a metal powder, and a leveler 219 that can level the top of each layer of deposited powder.

Figure 2A:
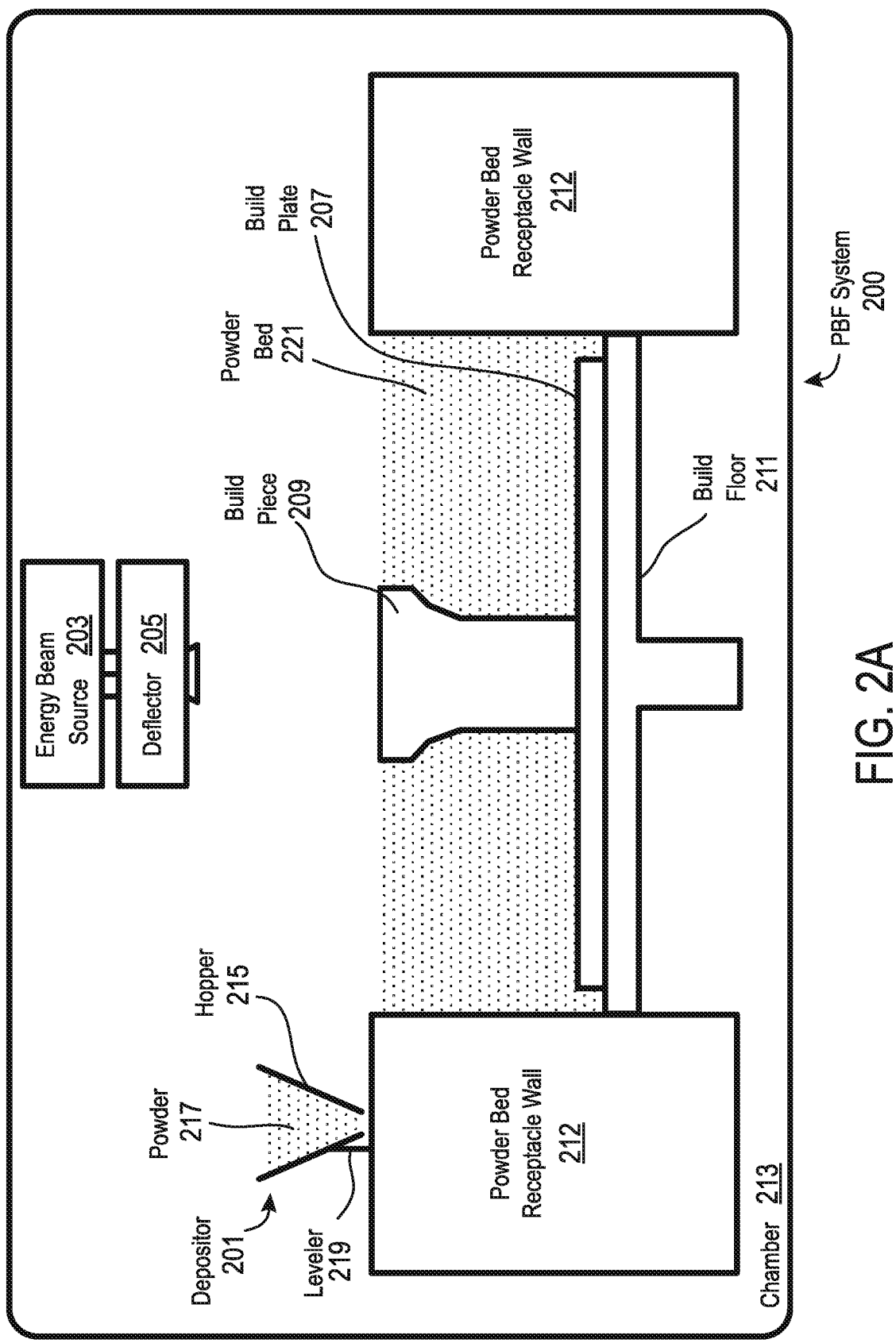
FIGS. 2A-D illustrate an example powder bed fusion (PBF) system during different stages of operation.

Referring specifically to FIG. 2A, this figure shows PBF system 200 after a slice of build piece 209 has been fused, but before the next layer of powder has been deposited. In fact, FIG. 2A illustrates a time at which PBF system 200 has already deposited and fused slices in multiple layers, e.g., 150 layers, to form the current state of build piece 209, e.g., formed of 150 slices. The multiple layers already deposited have created a powder bed 221, which includes powder that was deposited but not fused.

Figure 2B:
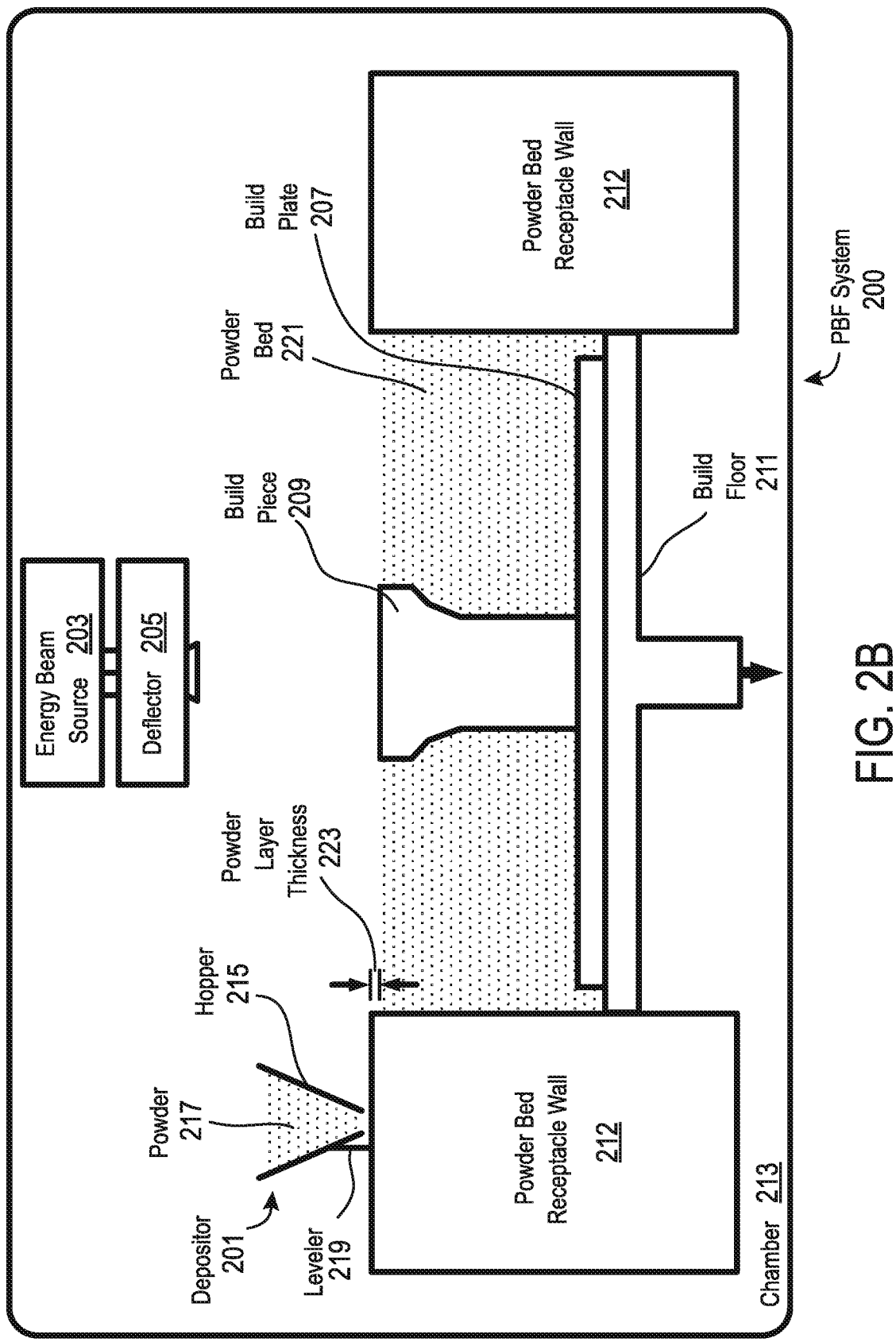

FIG. 2B shows PBF system 200 at a stage in which build floor 211 can lower by a powder layer thickness 223. The lowering of build floor 211 causes build piece 209 and powder bed 221 to drop by powder layer thickness 223, so that the top of the build piece and powder bed are lower than the top of powder bed receptacle wall 212 by an amount equal to the powder layer thickness. In this way, for example, a space with a consistent thickness equal to powder layer thickness 223 can be created over the tops of build piece 209 and powder bed 221.

Figure 2C:
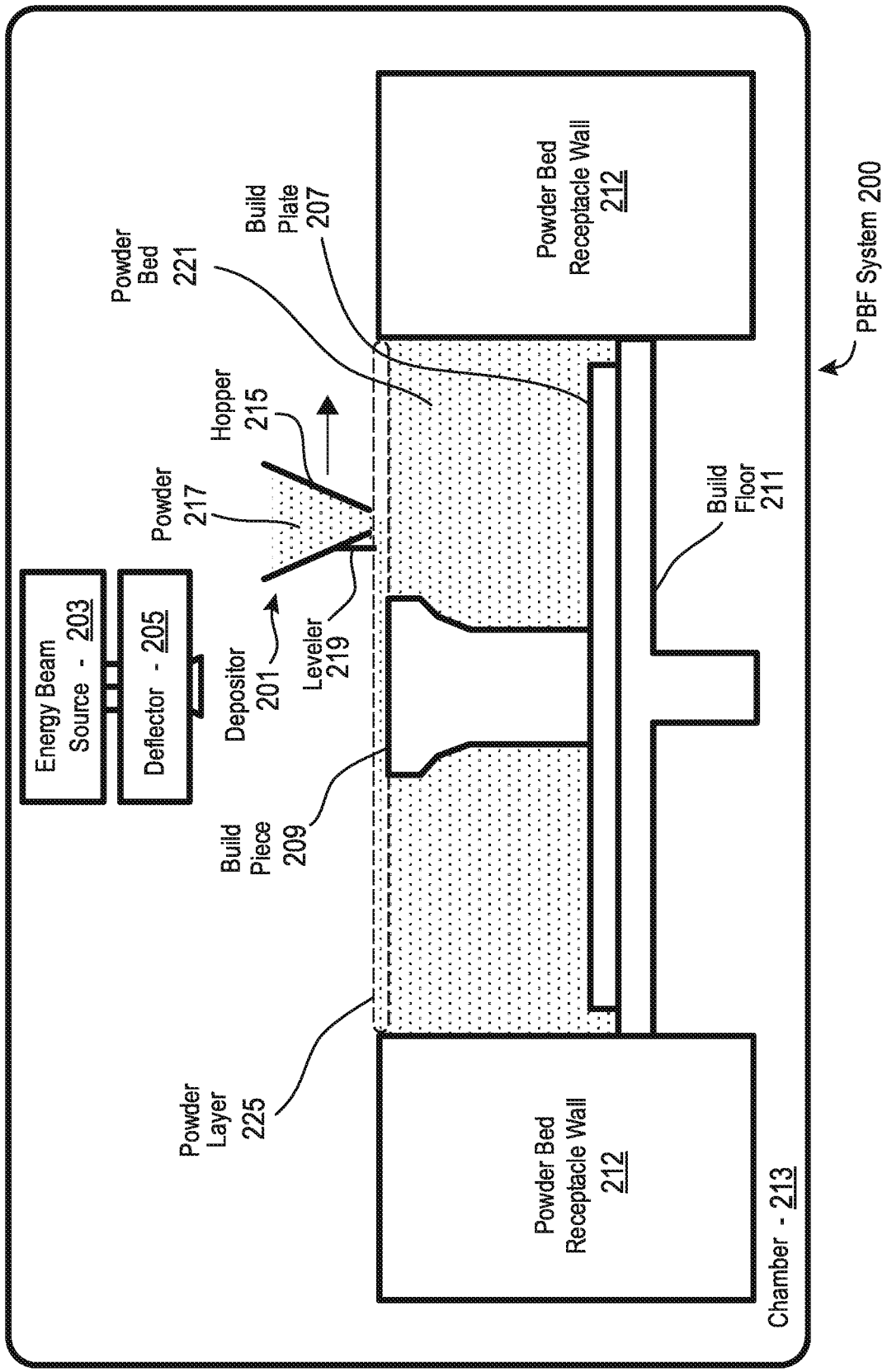

FIG. 2C shows PBF system 200 at a stage in which depositor 201 is positioned to deposit powder 217 in a space created over the top surfaces of build piece 209 and powder bed 221 and bounded by powder bed receptacle walls 212. In this example, depositor 201 progressively moves over the defined space while releasing powder 217 from hopper 215. Leveler 219 can level the released powder to form a powder layer 225 that has a thickness substantially equal to the powder layer thickness 223 (see FIG. 2B). Thus, the powder in a PBF system can be supported by a powder support structure, which can include, for example, a build plate 207, a build floor 211, a build piece 209, walls 212, and the like. It should be noted that the illustrated thickness of powder layer 225 (i.e., powder layer thickness 223 (FIG. 2B)) is greater than an actual thickness used for the example involving 250 previously-deposited layers discussed above with reference to FIG. 2A.

Figure 2D:
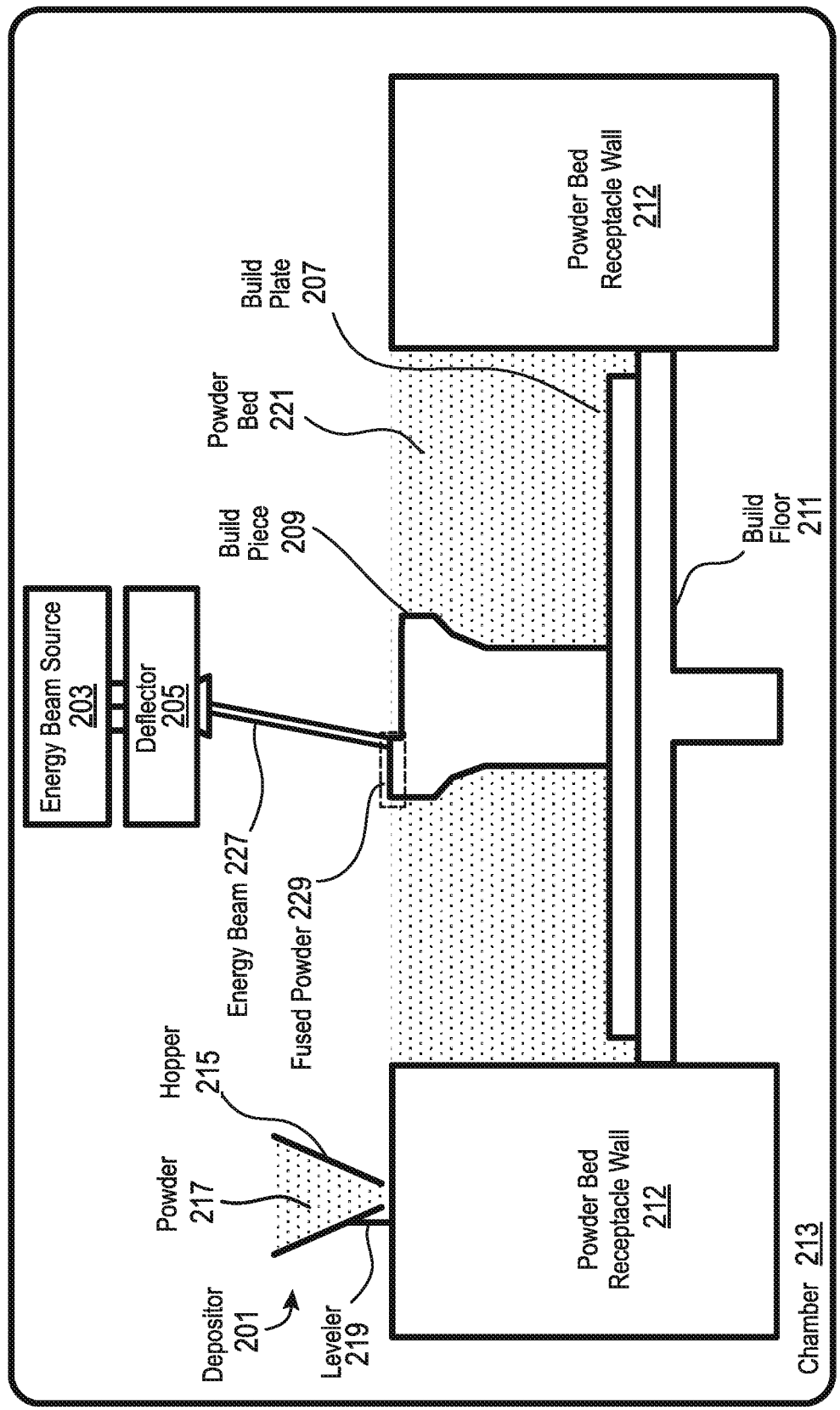

FIG. 2D shows PBF system 200 at a stage in which, following the deposition of powder layer 225 (FIG. 2C), energy beam source 203 generates an energy beam 227 and deflector 205 applies the energy beam to fuse the next slice in build piece 209. In various exemplary embodiments, energy beam source 203 can be an electron beam source, in which case energy beam 227 constitutes an electron beam. Deflector 205 can include deflection plates that can generate an electric field or a magnetic field that selectively deflects the electron beam to cause the electron beam to scan across areas designated to be fused. In various embodiments, energy beam source 203 can be a laser, in which case energy beam 227 is a laser beam. Deflector 205 can include an optical system that uses reflection and/or refraction to manipulate the laser beam to scan selected areas to be fused.

In various embodiments, the deflector 205 can include one or more gimbals and actuators that can rotate and/or translate the energy beam source to position the energy beam. In various embodiments, energy beam source 203 and/or deflector 205 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

The capability to additively manufacture parts enables the manufacturer to generate shapes, configurations, and structures that are not available in conventional manufacturing processes. Further, advances in AM technologies are expected to continue. Print speed is continually increasing. 3-D printer form factor has also seen regular advances. This means, among other things, that the area of the build platform as compared with the size of the component to be printed is becoming progressively larger as relevant build plates and printer profiles cross unprecedented boundaries in size, speed and sophistication. The availability and suitability of candidate materials and chemical compounds for use in AM is likewise increasing, meaning that the versatility of AM should continue to positively impact a variety of manufacturing applications.

During many AM processes, deposited powder that is not melted or fused together to become part of the structure can manifest itself as loose powder trapped within the AM structure after the AM process is complete. The trapped powder can interfere with internal functions or features of the AM structure and, left unaddressed, the trapped powder can cause more significant problems. For example, the trapped powder can make noise (e.g., when the AM structure is assembled into a vehicle or other transport structure, and the AM structure moves due to vibration), add permanent unnecessary mass to the AM structure, and/or cause the corresponding AM part to function improperly or to malfunction altogether due to the powder's potential to interfere with functional features (e.g., blocking channels, restricting intended rotational or translational motion of parts, saturating clamps and fixtures, etc.). Additionally, to the extent the AM part is assembled as part of a larger structure, components within the larger structure proximate the affected AM part also risk adverse effects from loose powder that disperses over time.

This problem is conventionally addressed via manual fixes at the design stage. After the structure is initially designed as a CAD or other data model but prior to AM, practitioners commonly use the CAD software to manually insert holes in perceived strategic locations of the modeled structure. The product is then 3-D printed. In a post-processing step, the practitioners attempt to use the holes to facilitate removal of the trapped powder from features internal to the structure. The manually-intense nature of this conventional modification of the data model can be laborious, especially as the geometric and functional complexity of the structure increases.

This problem can become substantially more complex where, as is usually the case, the geometry and the location of the powder holes are dependent on the loading and boundary conditions that may be specified for the component. To determine this information and its potential effect on hole design/placement, the designer may conduct a Finite Element Analysis ("FEA") test prior to modifying the data model with the insertion of such holes. FEA tests may determine loading stresses throughout the structure. Thereupon, holes may be incorporated into the data model design at points where the test results indicate that the projected stresses and loads are sufficiently low.

The complexity of the powder hole placement process, and relative time imposition on the designer, can be substantially greater under certain circumstances. For example, the stresses on the component as determined through FEA analyses may themselves be significant, thereby limiting practical and immediately-obvious alternatives for hole placement. Further, time and complexity of the process can be increased where the component includes a relatively large number of internal structural features that can trap powder, potentially requiring a greater number of pathways for enabling removal of loose powder. The options otherwise available to designers for placement of holes may be further circumscribed by various practical considerations, including for example a relative absence of gravitational advantages for moving trapped powder towards intended exit pathways, the lack (or absence) of short and straightforward available channels/pathways from internal to external structural portions, and the like.

Moreover, if a second FEA test (conventionally undertaken after completion of the initial or hole placement) projects additional deficiencies, the designer may be relegated to spend more time revising the initial hole placements. Reasons for such deficiencies may include, for example, the simulated crossing of stress thresholds or the creation of new stresses due to certain holes inserted for powder removal. Moreover, after each subsequent revision of powder hole placements, the designer manually performs an additional FEA analysis to verify structural integrity. This conventional "trial and error" approach to manual powder hole placement and modification, based on repeatedly negative FEA results, is cumbersome, inefficient and more often than not, fails to provide an optimal solution to a potentially expensive problem.

Accordingly, in one aspect of the disclosure, an automated apparatus and process for optimizing powder hole placement is presented. After completion of the AM component design using the data model, a powder feature insertion process is initiated. In contrast to conventional approaches, this automated process uses relevant criteria as precursors to a tangible analysis. As such, the process tends to produce an optimal yet simple solution to removing trapped powder.

In an exemplary embodiment, a plurality of criteria relating to the component to be 3-D printed and to the 3-D printer itself are received. Based on conclusions determined from these criteria and a relative weight accorded each conclusion based on, e.g., a reliability of the criteria in establishing the conclusion and an empirically-derived importance of the conclusion, an optimal set of powder removal features are determined for use with the component.

Such features include, for example, one or more apertures having a prescribed diameter and one or more powder channels traversing the structure having a defined geometry. Following an automated verification of structural integrity, the data model may be updated to incorporate the identified features. Thus for example, the optimization procedure may determine a number of apertures, their specific distribution across the data model of the AM component, the diameter and other geometrical attributes (e.g., thickness) of each aperture. The algorithm may additionally or alternatively identify one or more powder channels for transporting powder from the interior of the component to its exterior, and the specific location and geometry of each such channel. In an embodiment, the optimization algorithm includes techniques for providing redundancy and verifying integrity of its conclusions. In another embodiment, FEA analyses and related load verification tests are incorporated directly into the procedure. In still another embodiment, information concerning neighboring structures (if any) to the component may be considered in the overall analysis to account for both structural integrity and an optimization as influenced by design considerations of surrounding components.

Powder removal features. Powder removal features according to an embodiment may include apertures (holes) having an appropriate length to accommodate the thickness of a wall or structure, and having an appropriate diameter to accommodate the sizes of powder particles. Powder removal features may also include a powder channel, which may be a simple aperture of extended length. Alternatively, in some embodiments, a powder channel or powder transport path may be more akin to an arterial system that traverses through a sometimes substantial portion of the component and that may include within it smaller apertures that lead to smaller interior chambers to thereby provide a general passage for powder flow to an exterior of the component. In addition, in some embodiments, powder pockets or chambers may be created that may be configured to collect trapped powder from surrounding areas and provide it to a powder channel. In some configurations, powder pockets and channels may rely on the influence of gravity to enable trapped powder to flow. In other embodiments, powder channels may rely in part on air flow or suction to move trapped powder along its path.

Figure 3:
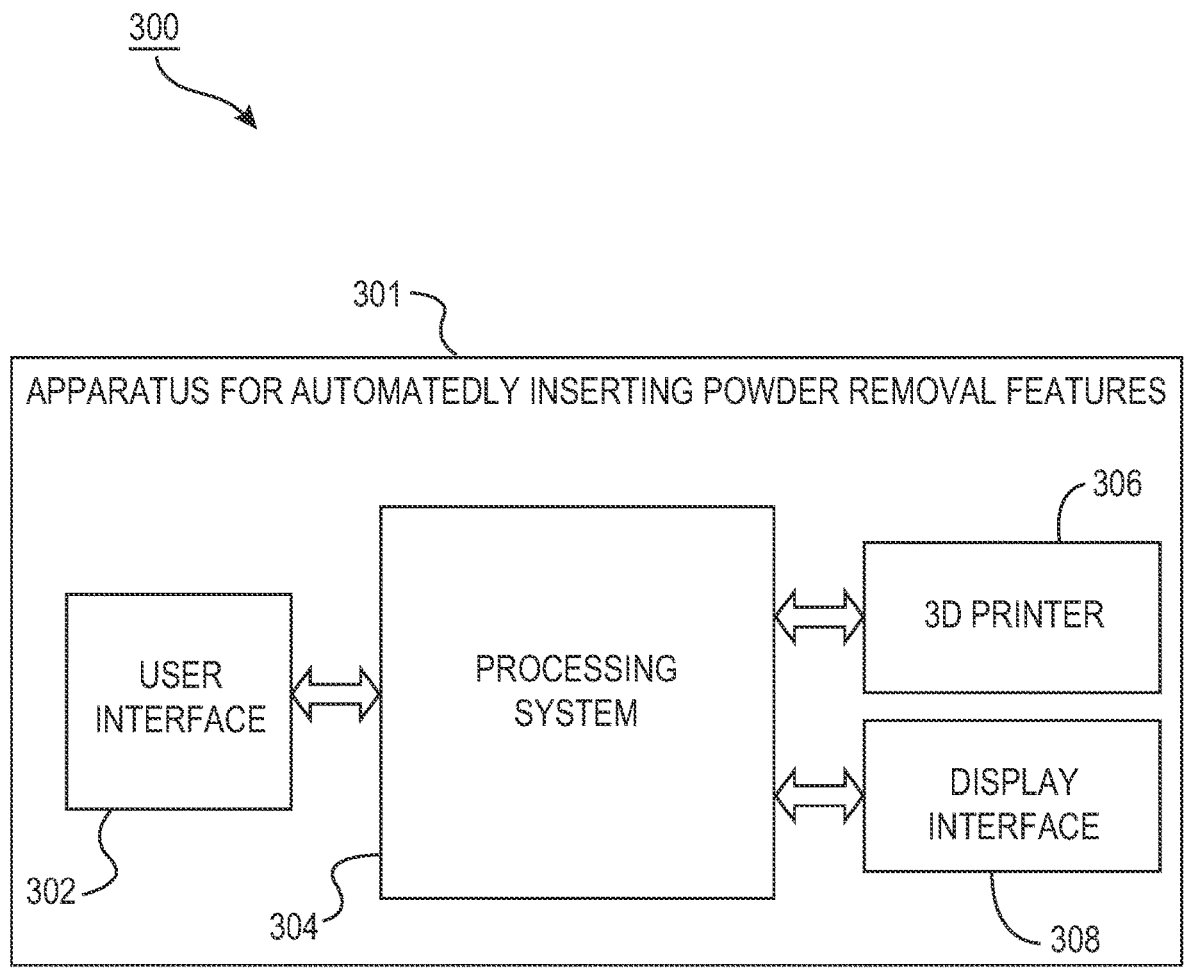
FIG. 3 illustrates an exemplary embodiment of an apparatus for facilitating powder removal from AM structures according to an aspect of the disclosure.

FIG. 3 illustrates an exemplary embodiment of an apparatus 301 for facilitating powder removal from AM structures according to an aspect of the disclosure. The apparatus 301 includes processing system 304, user interface 302, display interface 308, and 3-D printer 306. A processing system may, for example, include one or more processors or controllers together with memory for storing programs and data. For example, the processing system may include one or more processors as well as memory for storing data and program instructions. The instructions set forth in the exemplary flowcharts of FIGS. 4A-C, below, or a portion thereof, may be embodied as code in the memory.

Examples of processors that may be implemented in the processing system 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing system may include a computer-readable medium.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. A computer-readable medium may be a discrete storage component, such as a hard drive, or in some configurations it may be a plurality of discrete storage components distributed across multiple devices. Storage media may be any available media that can be accessed by a computer. By way of example, and not limitation, such computer-readable media can comprise random-access memory (RAM), read-only memory (ROM), electronically erasable programmable ROM (EEPROM), compact disk (CD) ROM (CD-ROM), or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

Referring still to FIG. 3, processing system may be coupled to a user interface 302. User interface 302 may be included within the same machine 304 in some embodiments, or user interface 302 may be part of a separate device in other embodiments. In the latter case, user interface 302 may be coupled to processing system directly, or through a network such as a Wi-Fi network, a virtual private network (VPN), an intranet, the Internet, or another network. These same types of interfaces and network connections may also be employed in the connection between processing system 304 and 3-D printer 306, and/or processing system 304 and display interface 308.

In an exemplary embodiment, 3-D printer is coupled to processing system 304 via a network. In an alternative embodiment, processing system 304 and 3-D printer 306 are part of the same device. Display interface 308 may be a separate device from the processing system 304, user interface 302, and 3-D printer 306, in which case display interface 308 may be suitably connected to processing system 304 via a network connection, a direct connection, or another suitable means. Alternatively, display interface 308 may be part of the same device as user interface 302. In an exemplary embodiment, user interface 302, processing system 304, and display interface 308 are part of a single computer system coupled to 3-D printer 306 via a direct or network connection. In one embodiment, apparatus 301 constitutes a single device. In another embodiment, apparatus 301 constitutes three or less directly connected devices. Other configurations of apparatus 301 or the elements within apparatus 301, are possible.

Figure 4B:
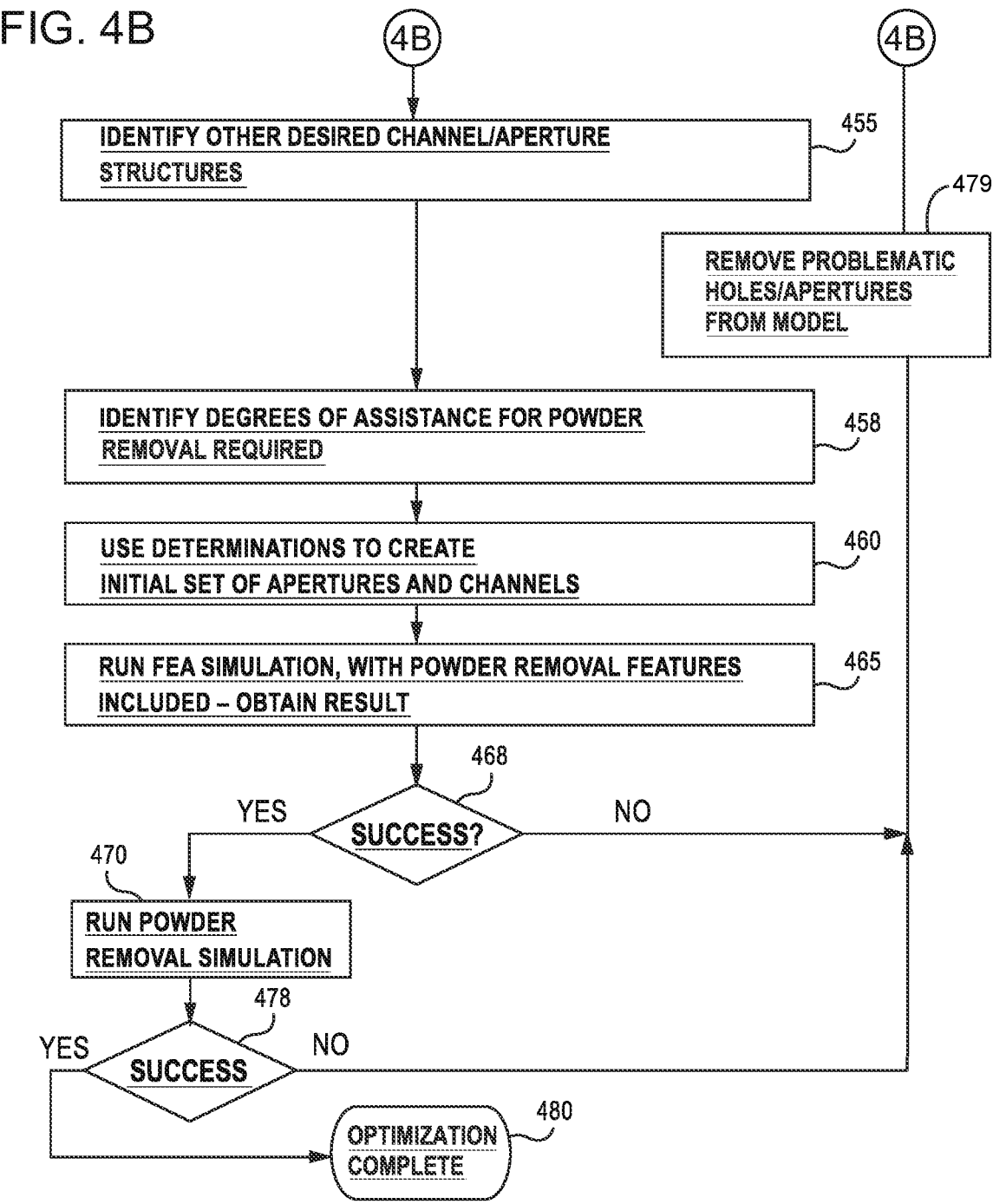

FIGS. 4A-B are a flow diagram illustrating an exemplary process for automatedly inserting apertures, powder channels and powder chambers into a data model for removal of powder from an AM structure based on that model. In one exemplary embodiment, many or most steps of FIGS. 4A-C are based directly or indirectly on a design flow that originates at the innermost portion of the component and terminates at the outside of the component. That is, the process uses the below-described information and step sequence to evaluate and select channels for powder transport from an inner portion of the component to an outer portion. A design flow according to this embodiment may assist with (i) facilitating easy removal of trapped powder from the inside of the component to its outside, (ii) determining an overall path of least resistance, which usually means making the smallest necessary structural change to the component to accomplish the intended purpose, and (iii) improving further upon the process in the event improvements are desired.

Referring initially to FIG. 4A, the process may be initiated at step 410 when a data model of the component to be 3-D printed is received. The data model, which can be a CAD model or any suitable model for use in describing the component, may include detailed information identifying each aspect of the structure and its geometry. Thus, for example, the data model may include a detailed representation of all internal features potentially contributing to the anticipated trapping of powder. At step 415, to the extent not already provided or otherwise made available by the data model at step 410, the process receives a detailed and comprehensive description of all materials that the component to be 3-D printed will include. Also, in an embodiment, the process is provided access with data that include capabilities and characteristics of different materials, such as those common for use in a 3-D printer, and the relative advantages and disadvantages of different materials, including different materials used in the same component.

Thereupon, at step 420, the process may receive comprehensive structural data concerning the component. In many instances, much or all of this information is provided or made available to the process in connection with one or both of steps 410 and 415. To the extent that some, most or all of this information has not been heretofore provided, the information may be provided at step 420. This information may include the loading data, which in turn may include actual data, estimated data, or both. For example, this data may include actual data regarding one or more stresses or loads asserted by one defined region of the component on another defined region. The data may further include the load on the component or a defined region thereof as a result of a larger structure if the component is assembled as part of the larger structure. In alternative embodiments in which loads are not precisely known in advance, estimated loads may be provided.

The stresses and loads may be defined to included forces having a magnitude and a direction, and thus for sophisticated loads, matrices and/or vectors may be used to describe the various components of the loads including magnitudes and directional components due to specific loads, all loads in total, the gravitational load, etc.

The data received by the process in step 420 may further include known boundary conditions for each region or border of the component, structural constraints, and other actual or anticipated material characteristics or properties. Such material characteristics or properties may include, for example, rigidity, thermal expansion coefficients, stiffness, flexibility, and the like.

As for the above collection of initial steps, it will be appreciated that in other embodiments, receipt of all of the identified information may not be necessary as accurate determinations may be made with just a subset of the identified information. In still other embodiments in which greater sophistication and precision are required, a still greater subset of this information may be desirable.

At step 425, the process may receive AM or 3-D printer related data. As in prior steps, some or all of this information may have been provided in connection with the receipt of the CAD model at step 410 or at one of the subsequent steps. The printer-specific data may include, for example, the type of AM process to be used, any materials that will be added onto the component after the AM process, the size distributions of the particles of powder to be used, whether an adhesive will be used in a post-processing step and the relevant details, an identification of the support material (if any) to be used in the AM process and the regions where the support material may be present. These specifications may, in one embodiment, be relevant to diameter requirements for apertures, capabilities of the 3-D printer to provide aerodynamic profiles for powder channels, etc.

At step 430, and based in part on information received in prior steps, the process may run an FEA test to determine initial structural integrity. This test may be conducted, as in the embodiment shown, as a baseline test of loading and stresses with no powder holes or channels yet constructed. In some embodiments, alternative variations of the FEA test may be conducted. After step 430, conclusions reached during the analyses may be retained for subsequent comparison purposes.

Having received necessary information and conducted an initial REA test, the process may gather component-specific information relevant to determining which powder removal features are needed. Different procedures may be used to accomplish these objectives. In this embodiment, at step 435, the process identifies the materials and structures within the component that may be preferred for powder feature insertion over other materials and structures within the component. For example, based on an analysis of the information received including the data model of the component, the process may first may determine which materials and sub-structures of the component are more amenable to further cutting and sculpturing of apertures or channels.

Next, in the same step 435, the process may determine which materials are thinner that lead to interior areas trapping powder, versus materials that are thicker. Generally, the thinner materials will be favored by some predetermined amount over the thicker materials for inserting apertures in the material. By contrast, in another embodiment, the thicker materials that border some interior area may be favored over the thinner materials for creating a channel. In this exemplary embodiment, each of these considerations may be given a proportionate percentage of consideration in determining where to insert apertures. It is further assumed in some embodiments that when adding holes and channels for powder removal, the lowest or least intrusive amount of change to the structure should be preferred, all else being equal.

In one exemplary embodiment, the process may determine paths for powder transfer from the inside of the component to the outside to facilitate easy removal of the trapped powder by identifying a path of least resistance.

At step 440, the process may identify a hierarchy of regions of the component's data model that are likely to include trapped powder. The importance of identifying such regions is that it may not be necessary to build holes for powder removal in regions without trapped powder. In an embodiment, the process obtains this information by identifying significant intersecting regions, or regions that include more structure (e.g., more walls), provided that each region has at least one wall or other structural obstacle that tends to keep powder trapped within those regions.

Step 440 may also include a search for volumes or regions in the component (i.e., in the data model), such as in a low inset into the component, that may trap powder due to gravity. Thus, if powder is deemed likely to congregate in a pocket or other region as a result of gravity, these regions may be identified as potentially requiring further powder removal features.

In another exemplary embodiment, the process may search at step 440 for regions that contain material having properties that naturally produce more powder. For instance, it may be the case that certain materials, even when fused, are likely to produce loose powder. For example, the type and size of the particle of material may be relevant to determining whether a powder removal feature is desirable. As another illustration, some regions of the data model may show a large number of fine structures that may be more susceptible to degrading into loose powder. If these conditions are present, they may justify use of powder removal features.

At step 445, the process may identify regions that, in view of the loading and stresses identified at step 430, certain of these regions may be more favorable candidates for powder removal features, and other regions may be less favored. In one exemplary embodiment, the process combines the data model with the information identified in step 430 and other information as needed. The process may determine that regions not subject to external loads or that have fewer internal stresses may not require powder removal features. It should be noted that in one embodiment, this information regarding regions not subject to significant loads may be combined with step 440 in which regions likely to include trapped powder were identified. Where a region A is likely to include trapped powder (step 440) and where the same region A includes no external loads and few external stresses (step 445), then in the absence of some other prohibition, region A may be a good candidate for incorporating a powder removal feature at its boundary. By contrast, if region A includes no major stresses but also likely has no trapped powder, an opposite conclusion may be reached. It should be noted that in general, areas that have significant loads or stresses may be adversely compromised by additional structural changes, and that this fact may be taken into consideration by the process.

In another embodiment, step 445 may identify regions in the component that have moderate external loads and moderate stresses as having a "middle ground". Thus, the process may define a value for these regions that is intermediate between the first case of region A (above) and a region that exhibits significant difficulty for removal of trapped powders. In this case, that other steps in the process may ultimately be used to determine whether powder removal features are necessary or desirable for these regions.

As another example, the process in step 445 may also identify regions that have significant loads and weak overall intrinsic supports. These regions may be identified as disfavored for employing powder removal pathways.

In an embodiment, the process may take into consideration information relating to analogous components or earlier models of the same component to augment the decision-making process concerning this component. Thus, for example, if at step 445 a region is ruled as disfavored to some measurable extent, but that in the prior step 440 the same region was identified as requiring a channel for power removal, then the process may consider "analogous" data from similar 3-D printed structures (e.g., earlier models of this structure) in rendering a determination. This information may also include FEA results from prior similar components.

At step 450, the process may identify path features. For example, the process may measure from the data model path lengths from powder concentration areas to areas outside the component. In an embodiment, this information may establish whether an aperture is feasible or, in appropriate cases, where a channel can instead be created to remove powder. Conclusions may be drawn for various applicable regions of the component, and a weight may be accorded each conclusion. The information from this step 450 along with other steps (including, for example step 435) may ultimately be used to determine and identify the path(s) of least resistance to remove trapped powder from the inside of the component to the outside.

In one embodiment, in addition to path length, the process at step 450 may also gather additional information about candidate regions for powder pockets. A powder pocket is a partially-enclosed region within the structure that receives loose powder from other regions as a result of strategically-placed powder removal features, the geometry of the structure itself, and/or gravity. In one embodiment, the powder pocket is engraved within the structure. In some embodiments, the complexity of a structure may mean that a required solution should include one or more powder pockets that work in conjunction with one or more powder channels and apertures to transport trapped powder away from as much of the interior as possible. In this embodiment, the 3-D printing step may simply be followed by an air flow step through which trapped loose powder may be eliminated from powder pockets via the powder removal features.

Referring to FIG. 4B, at step 455, the process may identify other desired channel or aperture structures. In one embodiment, the process considers a given region likely to include loose powder and determines what alternatives are available. For example, it is assumed that a particular wall surrounding a portion of such region was previously determined to be thin enough to suitably accommodate an aperture such that trapped powder could be flushed out. It was also determined in a subsequent step, however, that the required diameter of the aperture (set by the size of the loose powder particles) is too large such that the structural integrity of the wall would not be adequately sustained. Accordingly, at step 455 in one embodiment, different alternatives may be considered to remove loose powder from that region. For example, another wall surrounding another portion of the region at issue may also be analyzed for this purpose. In addition, assuming this other wall is found to have the requisite structural integrity to accommodate the diameter of an aperture, it may be determined whether an aperture in that wall would lead from the region at issue to a pathway exterior to the component to allow removal of the trapped powder.

If the wall is found not to satisfy these criteria for the region at issue, it may next be determined whether other alternatives are available. For example, the process may consider an increased air flow, a suction mechanism, gravitational assistance, and/or use of another pathway. All of these factors may be considered and relatively weighed. In an embodiment, if all choices result in non-ideal solutions, the option that includes the least structural compromise may be selected.

At step 458, degrees of assistance for powder removal are prioritized, if more than one option is available. In an embodiment, pathways (e.g., channels and apertures) for which powder flow is facilitated mainly by the influence of gravity are the most favored. Powder removal requiring positive air flow and/or suction may be the second-most favored. Movement or other manipulation of the part may be the third-most favored, and so on. Then other alternative feature types may also be narrowed down. Shorter paths are favored over longer ones. Additionally, certain configurations may favor others. For example, a single, long powder channel with aerodynamic contour may be favored over three short powder channels, one of which lack a contour. Rules that favor or disfavor alternatives can be programmed into the algorithm and changed periodically or on the fly.

At step 460, determinations are finalized, alternatives are compared and weighed. The process applies its rules using the information it initially acquired as a result of programming, and the additional knowledge the process acquires through analysis of the data model to determine a set of one or more apertures, powder channels, and/or powder chambers. An air flow path, if required, may be designated. An order for using the paths, if required, may also be designated. The location and type of all powder removal features are designated. Step 460 in one embodiment applies the changes directly to the data model, such as by updating the CAD program to incorporate the apertures and contoured powder channels.

In an embodiment, the process at step 460 also evaluates and selects channels for powder transport from an inner portion of the component to an outer portion to facilitate easy removal of trapped powder and to determine an overall path of least resistance.

At step 465, the FEA test or a similar structural analysis is rerun. Upon non-ideal solution (468), the process attempts to resolve the failed areas by removing the offending or problematic apertures or channels from the model (step 479). Control then returns to step 435, where the process reruns its conclusion and determination efforts in light of the new FEA data and the new removal of the perceived problem paths. In this embodiment, the entire process may be run from step 435 onward to enable a new solution (affirmatively excluding the last solution) to be identified.

If, by contrast, the FEA test succeeds, the process at step 470 may run a powder removal simulation. Unlike a test in which the loads and structural integrity of the component are assessed, this test may simulate the effectiveness of the chosen pathway in removing trapped powders. The required parameters for this test may vary widely depending on the configuration. In one exemplary embodiment, the simulation may endeavor to identify an alternative path, if one exists, that is simpler (i.e., requires fewer paths and apertures, etc.) than the path being used. If the simulation produces non-ideal results, the process may identify the point of failure, after which it may remove the perceived failure point from the model and return control back to step 435. At step 465, the process may be rerun with the new inputs. If the simulation is successful (468), the optimization is complete (480).

Figure 5:
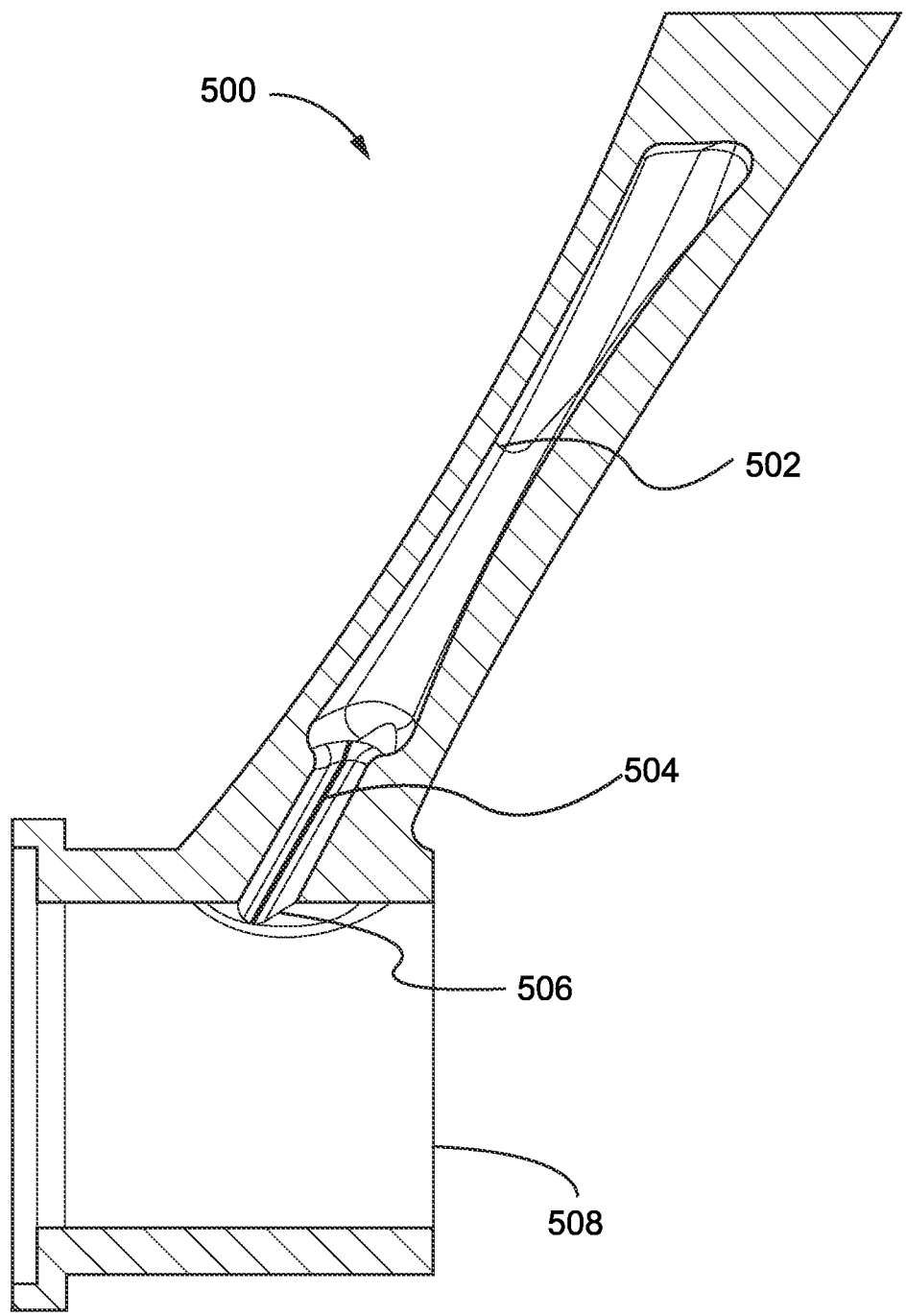
FIG. 5 is a view of an exemplary AM structure having powder removal features.

FIG. 5 is an view of an exemplary AM structure 500 having powder removal features. AM structure 500 is a structure produced from a data model using a PBF technique. The structure 500 may include a powder reservoir 502 designed by the optimization routine. A powder reservoir, also referred to as powder chamber, is a region designated for the loose powder to be stored. The powder reservoir 502 may serve as an inlet or outlet for the movement of powder. In this example, powder may accumulate in powder reservoir 502, from which it may travel through a powder channel such as powder channel 504 via the influence of gravity, suction, etc. Powder channel 504 may lead to powder hole 506, which is connected in this example to a large hollow area defined by cylindrical region 508. A side of hollow cylindrical region 508 may be open to an outside of the structure 508. Loose powder can easily be channeled to region 508 and then outside the part.

The methods described in the above description may be effectuated by a computer or other processing system as described with reference to FIG. 3, above. In some configurations, the techniques described herein may be performed separately by a computer or by a computer or other processing system coupled to or otherwise integral to the 3-D printer system. In some embodiments involving the 3-D printer as a fully functional integrated system, a computer or processing system may be built into the system or coupled to the system, whether networked or in the same system or functional set of components.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing nodes and interconnects. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A 3-D printer, comprising:
   a powder bed for storing powder;
   a depositor configured to deposit successive layers of the powder;
   an energy beam;
   a deflector configured to apply the energy beam to fuse the powder;
   a build plate configured to support a build piece; and
   a processing system configured to receive a model of a component to be additively manufactured, determine optimal size and location of one or more apertures in the component for powder removal, update the model to include the one or more determined powder removal apertures and an internal reservoir coupled to at least one channel arranged between the reservoir and the one or more apertures, and use the updated model to control the energy beam to 3-D print the build piece;
   wherein the processing system is further configured to determine the optimal size and location of the one or more apertures, the reservoir and the at least one channel by evaluating loading and boundary conditions for the component and a type of material to be used as powder particles in the additive manufacturing of the component.

2. The 3-D printer of claim 1, wherein the processing system is further configured to determine optimal size and location of the one or more apertures by evaluating potential gravitational advantages for facilitating powder removal.

3. An apparatus for automatedly inserting powder removal features in an additively manufactured component, the apparatus configured to:
   receive a model of a component to be additively manufactured;
   determine optimal size and location of one or more apertures in the component for powder removal; and
   update the model to include the one or more determined powder removal apertures and an internal reservoir coupled to at least one channel arranged between the reservoir and the one or more determined powder removal apertures;
   wherein the determining the optimal size and location of the one or more apertures, the reservoir and the at least one channel comprises evaluating loading and boundary conditions for the component and a type of material to be used as powder particles in the additive manufacturing of the component.

4. The apparatus of claim 3, wherein the determining optimal size and location of the one or more apertures comprises evaluating potential gravitational advantages for facilitating powder removal.

5. The apparatus of claim 3, further configured to determine geometry and location of one or more powder channels for removing powder after additively manufacturing the component.

6. The apparatus of claim 5, wherein the determining geometry and location of the one or more powder channels comprises identifying a shortest removal path.

7. The apparatus of claim 5, wherein the determining geometry and location of the one or more powder channels comprises identifying a path of least material resistance.

8. The apparatus of claim 5, wherein the determining geometry and location of the one or more powder channels comprises evaluating potential gravitational advantages for facilitating powder removal.

9. The apparatus of claim 3, wherein the determining optimal size and location of the one or more apertures comprises specifying an aerodynamic contour for the aperture to facilitate subsequent powder removal through air flow.

10. The apparatus of claim 5, wherein the determining geometry and location of the one or more powder channels comprises specifying an aerodynamic contour for the one or more powder channels to facilitate subsequent powder removal through air flow.

11. The apparatus of claim 3, wherein the determining optimal size and location of the one or more apertures comprises evaluating at least one of powder material, powder particle size distribution, average powder flow rate, and powder type.

12. The apparatus of claim 5, wherein the determining geometry and location of the one or more powder channels comprises evaluating at least one of powder material, powder particle size, average powder flow rate, and powder type.

* * * * *